(12) United States Patent
Atkinson

(10) Patent No.: US 7,156,425 B2
(45) Date of Patent: Jan. 2, 2007

(54) QUICK CONNECT AND QUICK DISCONNECT PLUMBING APPARATUS

(76) Inventor: Manuel Diaz Atkinson, 5513 Naaman Forest Blvd., #1001, Garland, TX (US) 75044

( * ) Notice: Subject to any disclaimer, the term of this patent is extended or adjusted under 35 U.S.C. 154(b) by 0 days.

(21) Appl. No.: 10/990,018

(22) Filed: Nov. 16, 2004

(65) Prior Publication Data
US 2005/0104371 A1 May 19, 2005

Related U.S. Application Data

(60) Provisional application No. 60/523,218, filed on Nov. 19, 2003.

(51) Int. Cl.
*F16L 41/00* (2006.01)
(52) U.S. Cl. .............................. 285/133.4; 285/133.11; 285/133.3; 285/354; 285/386
(58) Field of Classification Search ........... 285/133.11, 285/133.21, 133.3, 133.4, 354, 386, 387, 285/389
See application file for complete search history.

(56) References Cited

U.S. PATENT DOCUMENTS

| | | | | |
|---|---|---|---|---|
| 1,993,372 A | * | 3/1935 | Jones | 285/386 |
| 2,850,299 A | * | 9/1958 | Risley | 285/48 |
| 3,126,212 A | * | 3/1964 | Young | 285/12 |
| 3,486,771 A | * | 12/1969 | Conlin | 285/39 |
| 3,729,791 A | * | 5/1973 | Theobald | 29/890.148 |
| 3,831,983 A | * | 8/1974 | Stickler | 285/12 |
| 3,879,064 A | * | 4/1975 | Lagarelli | 285/12 |
| 4,484,770 A | * | 11/1984 | Sloane | 285/55 |
| 5,024,419 A | * | 6/1991 | Mulvey | 251/148 |
| 5,293,903 A | * | 3/1994 | Appelwick | 137/887 |
| 5,308,122 A | * | 5/1994 | Crawford et al. | 285/52 |
| 5,364,134 A | * | 11/1994 | Anderson | 285/38 |
| 5,992,904 A | * | 11/1999 | Hitachi et al. | 285/332 |

* cited by examiner

*Primary Examiner*—James M. Hewitt
(74) *Attorney, Agent, or Firm*—Herbert L. Bello

(57) ABSTRACT

A plumbing apparatus for connecting a tankless hot water heater to a cold water supply line and a hot water outlet line includes a union and a tee that are interconnected to one another. A first connector at one end of the union is provided for connecting the union to the tankless hot water heater. A second connector at a free end of the tee is provided for connecting the tee to either the cold water supply line or the hot water outlet line. The tee is provided with a branch for connecting the plumbing apparatus to a plumbing device. A passage formed in the union and tee permits fluid to flow there through and through the branch.

17 Claims, 6 Drawing Sheets

QUICK CONNECT AND QUICK DISCONNECT PLUMBING APPARATUS

CROSS-REFERENCE TO RELATED APPLICATIONS

Benefit is claimed under Title 35, United States Code, § 119 (e) of U.S. Provisional Application No. 60/523,218, filed Nov. 19, 2003.

BACKGROUND OF THE INVENTION

1. Field of Invention

The present invention relates to quick connect, quick disconnect plumbing apparatuses, and more particularly, is directed to a quick connect and quick disconnect plumbing apparatus for use with tankless water heaters.

2. Description of the Prior Art

It is time consuming and labor intensive for a plumber to install and connect a tankless water heater to a water supply and home heating system. In order to connect the tankless water heater, the plumber must cut, sand and solder many copper pipes and numerous copper fittings. The greater the number of fittings and soldered joints, the greater the chance for water leaks to occur.

A need has arisen for a relatively simple and inexpensive quick connect and quick disconnect plumbing apparatus for use in connecting water heaters, particularly, tankless water heaters.

SUMMARY OF THE INVENTION

An object of the present invention is to overcome the aforementioned limitations and disadvantages of prior art plumbing hardware associated with the installation and connection of water heaters, particularly, tankless water heaters.

Another object of the present invention is to provide a quick connect and quick disconnect plumbing apparatus that facilitates the installation and connection of tankless water heaters.

Yet another object of the invention is to provide a quick connect and quick disconnect plumbing apparatus that facilitates troubleshooting of a tankless water heater.

A further obj ect of the invention is to provide a quick connect and quick disconnect plumbing apparatus that allows for a compact installation of the tankless water heater.

The quick connect and quick disconnect plumbing apparatus embodying the present invention comprises a fitting having a union portion that is connected to a tee portion. The union portion comprises a union tail member and an internally threaded union nut. The union tail member includes an internally threaded hexagonal head that terminates in an inwardly tapered external seat, an external flange formed at the upper or widest part of the seat. The union nut is internally threaded and includes an internal flange that is configured to engage the external flange of the union tail member, the inside diameter of the internal flange being smaller than the outside diameter of the external flange.

The tee portion comprises a body having upper, intermediate and lower sections. The upper section includes an externally threaded member with an inwardly tapered internal seat. The threads of the externally threaded member of the upper section are sized to mate with the threads of the internally threaded hexagonal head of the union tail member and the external seat of the union tail member is configured to mate with the internal seat of the upper section. The intermediate section has an internally threaded female branch and the lower section terminates in either an externally threaded male section or a sweat or solder connection.

Other general and specific objects, features and advantages of the invention will in part be obvious and will in part appear hereinafter.

BRIEF DESCRIPTION OF THE DRAWINGS

An understanding of the nature and objects of the present invention will become more readily apparent upon consideration of the following detailed description taken in connection with the accompanying drawings, wherein.

DETAILED DESCRIPTION OF THE INVENTION

Figure 1:
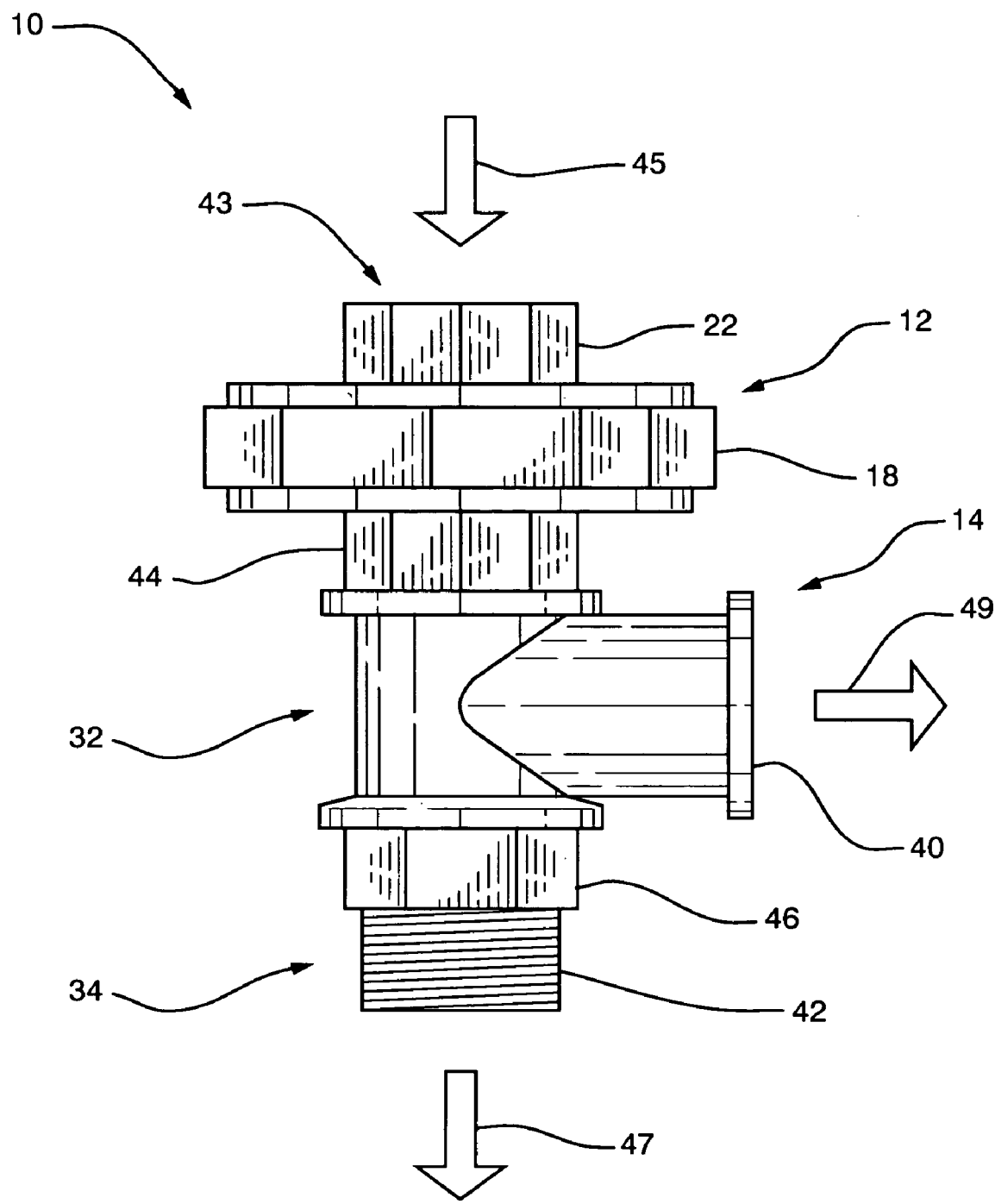
FIG. 1 is a perspective view of a quick connect and quick disconnect plumbing apparatus embodying the invention with a single outlet and a threaded connection.
Figure 5:
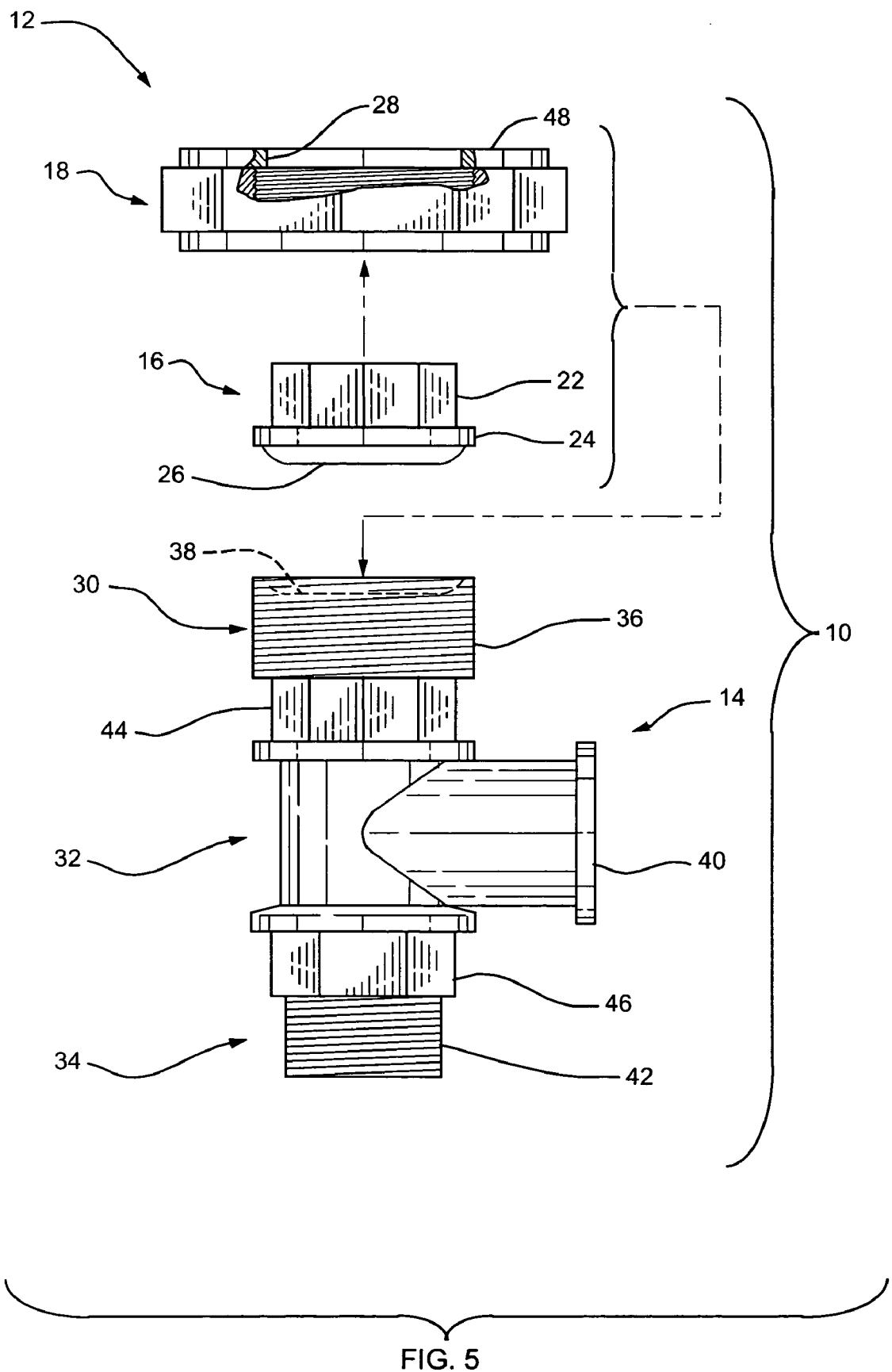
FIG. 5 is an exploded view of a quick connect and quick disconnect plumbing apparatus of FIG. 1.

Referring now to the drawings, particularly FIGS. 1 and 5, a quick connect and quick disconnect plumbing apparatus 10 embodying the invention comprises a union portion 12 and a tee portion 14.

Union portion 12 includes a union tail member 16 and a union nut 18. Union tail member 16 includes an internally threaded hexagonal head 22, an external flange 24 and an inwardly tapered external seat 26. Union nut 18 is internally threaded and includes an internal flange 28. The internal threads of union nut 18 define a connecting means for connecting union portion 12 and tee portion 14. The inside diameter of internal flange 28 is smaller than the outside diameter of external flange 24.

Tee portion 14 has an upper section 30, an intermediate section 32 and a lower section 34. Upper section 30 includes an externally threaded member 36 having an inwardly tapered internal seat 38. The threads of the externally threaded member 36, which define a connection means for connecting tee portion 14 to union portion 12, are sized to mate with the threads of the internally threaded union nut 18 and external seat 26 is configured to mate with internal seat 38. Intermediate section 32 has an internally threaded female branch 40 extending therefrom is substantially perpendicular relationship to a longitudinal axis of tee portion 14. Lower section 34 is formed with an externally threaded male member 42. A hexagonal hold 44 is disposed between upper section 30 and intermediate section 32. A hexagonal hold 46 us disposed between intermediate section 32 and lower section 34. As hereinafter described, holds 44 and 46 are provided as means for holding quick connect and quick disconnect plumbing apparatus 10 stationary during connections.

In the assembly of quick connect and quick disconnect plumbing apparatus 10, union tail member 16 is inserted into union nut 18. External flange 24 is pressed against internal flange 28, whereby union tail member 16 is prevented from being pushed through an open end 48 of union nut 18. Then, union nut 18 is turned onto externally threaded member 36 of tee portion 14 until external seat 26 of union tail member 16 is seated in internal seat 38 in upper section 30. An internal passage 43 is formed in quick connect and quick disconnect plumbing apparatus 10, the passage defining a channel for a fluid to flow from an inlet 45 to outlets 47 and 49. Inlet 45 and outlet 47 are disposed along a common axis and outlet 49 is disposed along an axis that is disposed in perpendicular relationship to the common axis. For convenience, as viewed in the drawings. particularly FIGS. 1 and 5, an upper end of internal passage 43 of union portion 12 at inlet 45 may be referred to as a first end of the union portion and the other end of the union portion that is connected to tee portion 14 may be referred to as a second end of the union portion. Also, upper section 30 of tee portion 14 may be referred to as a first end of the tee portion. lower section 34 of tee portion 14 at outlet 47 may be referred to as a second end of the tee portion, and intermediate section 32 of tee portion 14 at outlet 49 may be referred to as a third end of the tee portion.

Figure 2:
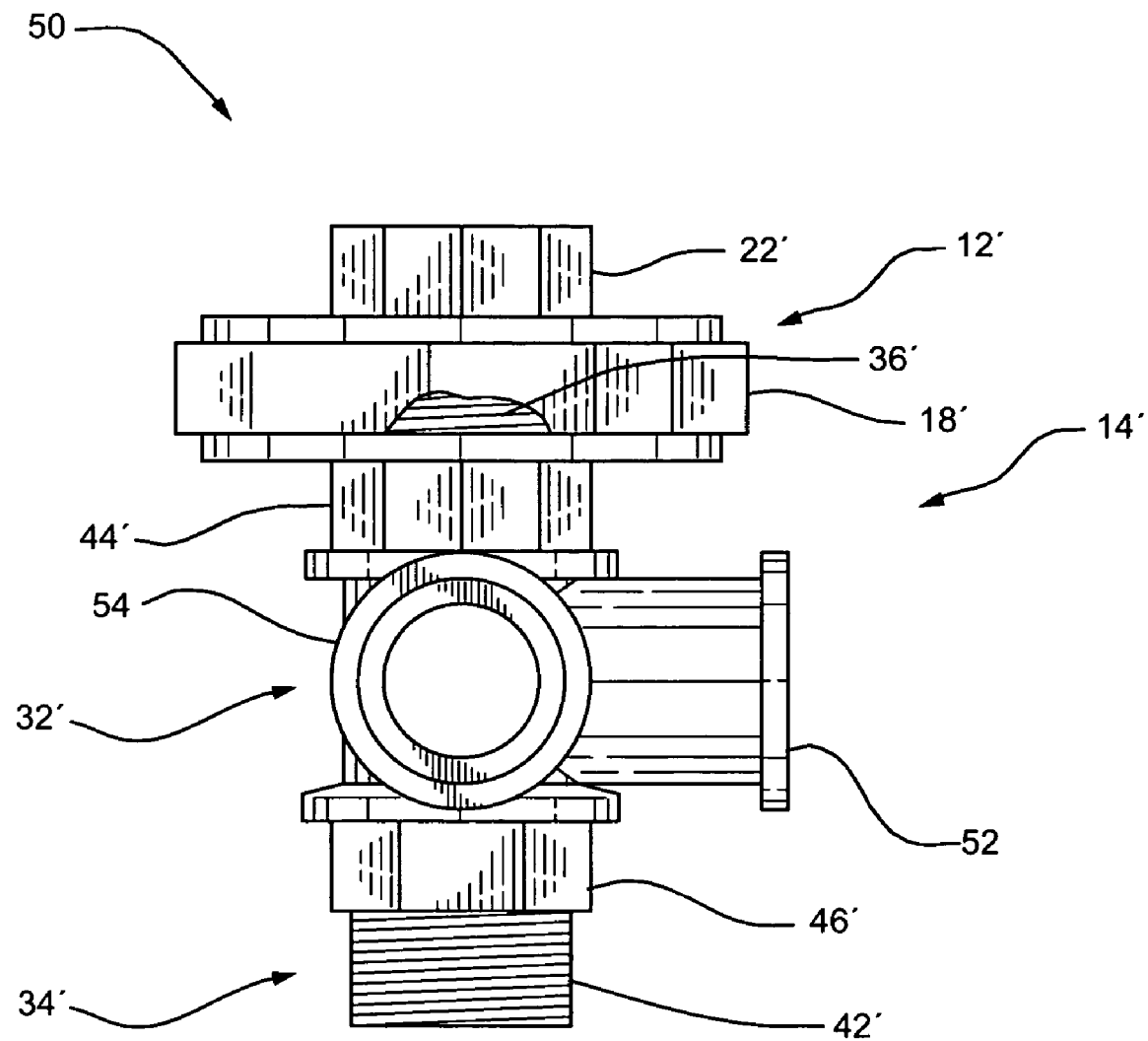
FIG. 2 is a perspective view of a quick connect and quick disconnect plumbing apparatus embodying the invention with two outlets and a threaded connection.

A quick connect and quick disconnect plumbing apparatus 50, which is an alternate embodiment of quick connect and quick disconnect plumbing apparatus 10, is shown in FIG. 2. Quick connect and quick disconnect plumbing apparatus 50 is similar in construction to quick connect and quick disconnect plumbing apparatus 10. For convenience, corresponding parts of quick connect and quick disconnect plumbing apparatuses 10 and 50 are identified with like reference numbers and distinguished by a prime notation. As shown in FIG. 2, quick connect and quick disconnect plumbing apparatus 50 is provided with first and second internally threaded female branches 52 and 54, respectively, rather than the single female branch 40. In the illustrated embodiment, female branches 52 and 54 are disposed at substantially ninety degrees to one another. In an alternate embodiment, female branches 52 and 54 are disposed at substantially one hundred and eighty degrees from one another. It is to be understood that, in further alternate embodiments, the number of internally threaded branches is other than one or two, for example, three or four.

Figure 3:
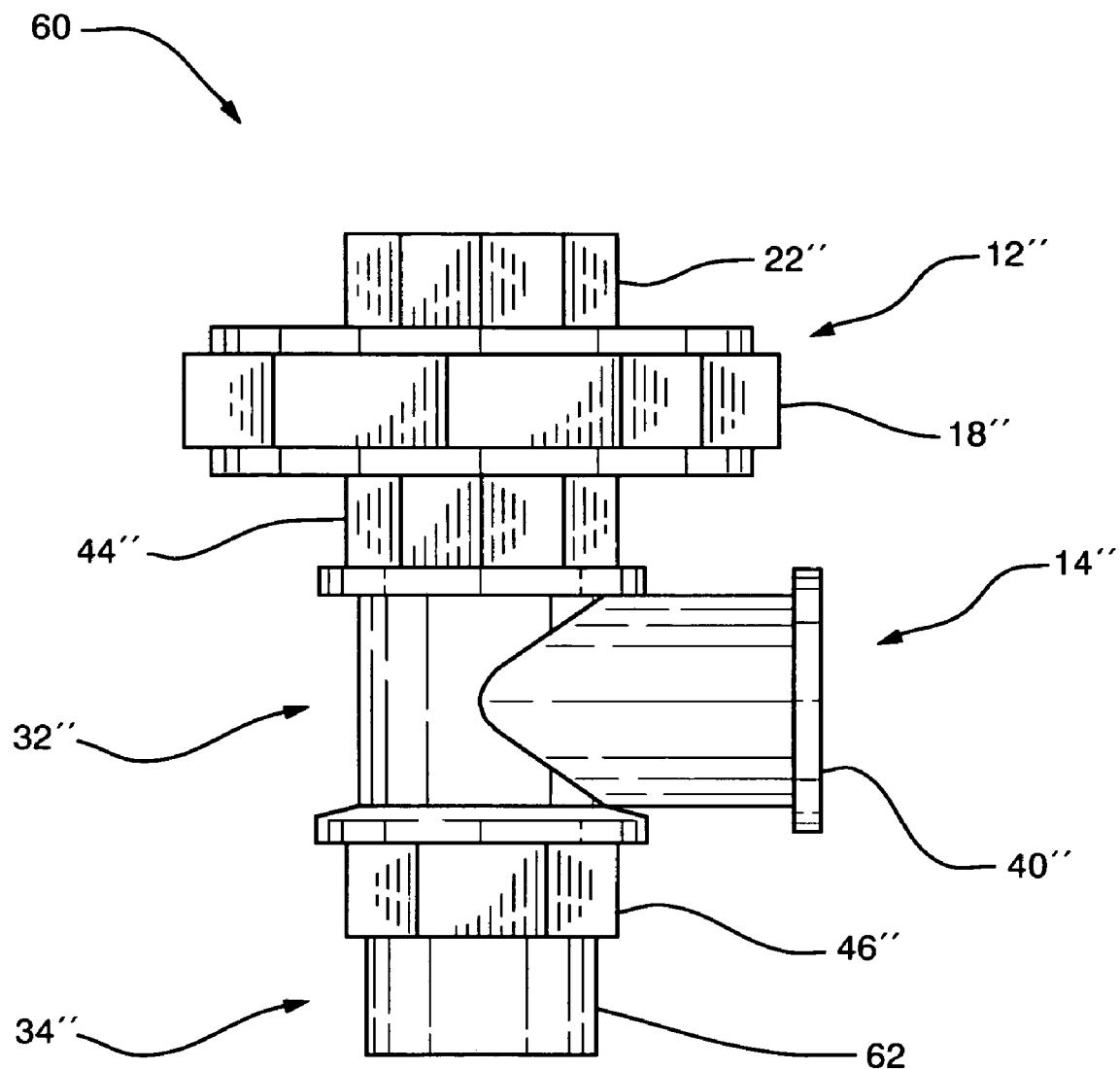
FIG. 3 is a perspective view of a quick connect and quick disconnect plumbing apparatus embodying the invention with a single outlet and a sweat or solder connection.

Referring now to FIG. 3, there is shown an alternate embodiment of quick connect and quick disconnect plumbing apparatus 10 in the form of a quick connect and quick disconnect plumbing apparatus 60. For convenience, corresponding parts of quick connect and quick disconnect plumbing apparatuses 10 and 60 are identified with like reference numbers and distinguished by a double prime notation. In quick connect and quick disconnect plumbing apparatus 60, a tee portion 14" is provided with a sweat or solder connection 62 rather than the externally threaded male member 42.

Figure 4:
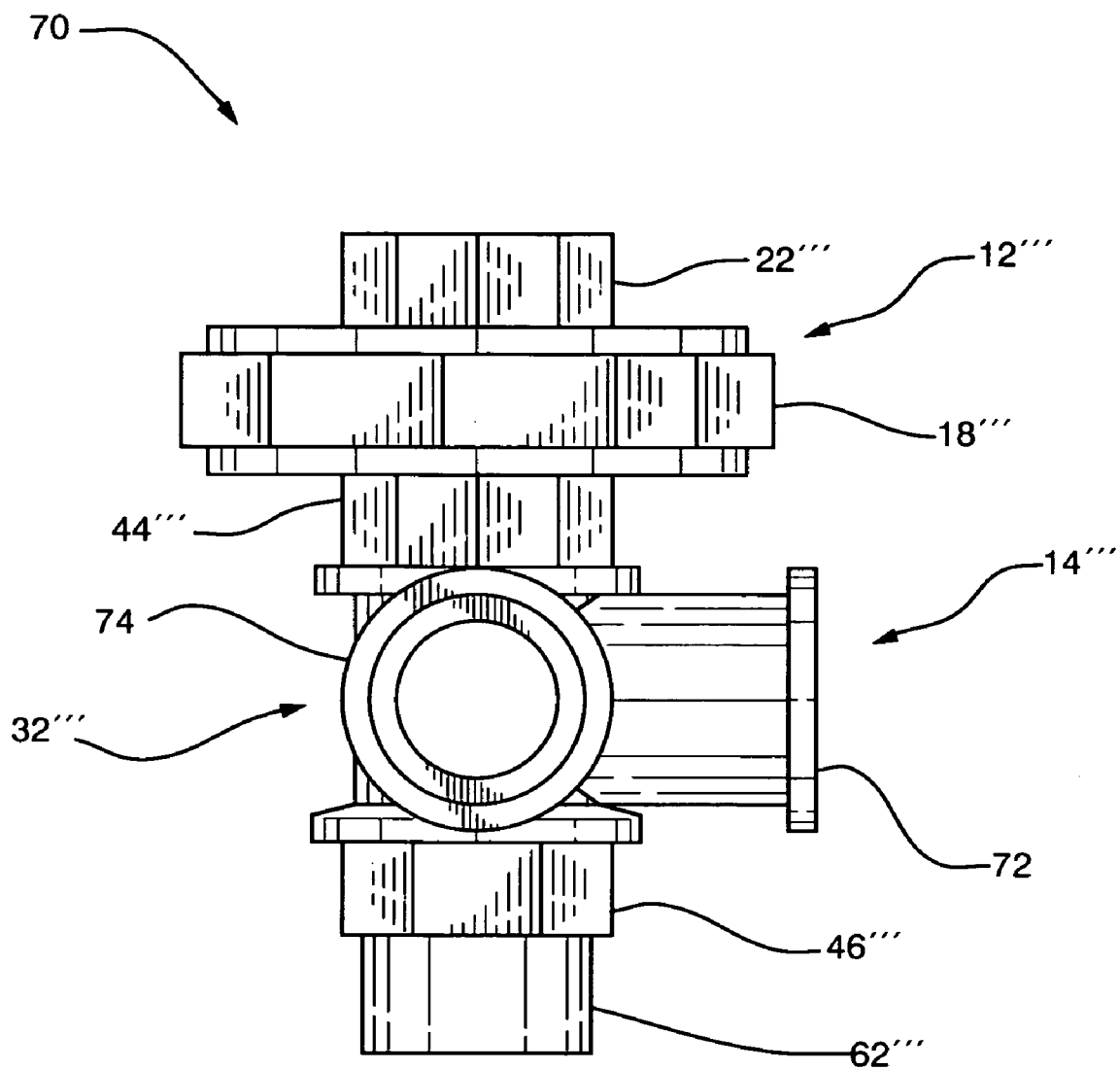
FIG. 4 is a perspective view of a quick connect and quick disconnect plumbing apparatus embodying the invention with two outlets and a sweat or solder connection.

A quick connect and quick disconnect plumbing apparatus 70, which is an alternate embodiment of quick connect and quick disconnect plumbing apparatus 60, is shown in FIG. 4. Quick connect and quick disconnect plumbing apparatus 70 is similar in construction to quick connect and quick disconnect plumbing apparatus 60. For convenience, corresponding parts of quick connect and quick disconnect plumbing apparatuses 60 and 70 are identified with like reference numbers and distinguished by a triple prime notation. As shown in FIG. 4, quick connect and quick disconnect plumbing apparatus 70 is provided with first and second internally threaded female branches 72 and 74, respectively, rather than the single female branch 40". In the illustrated embodiment, female branches 72 and 74 are disposed at substantially ninety degrees to one another. In an alternate embodiment, female branches 72 and 74 are disposed at substantially one hundred and eighty degrees from one another. It is to be understood that, in further alternate embodiments, the number of internally threaded branches is other than one or two, for example, three or four.

Figure 6:
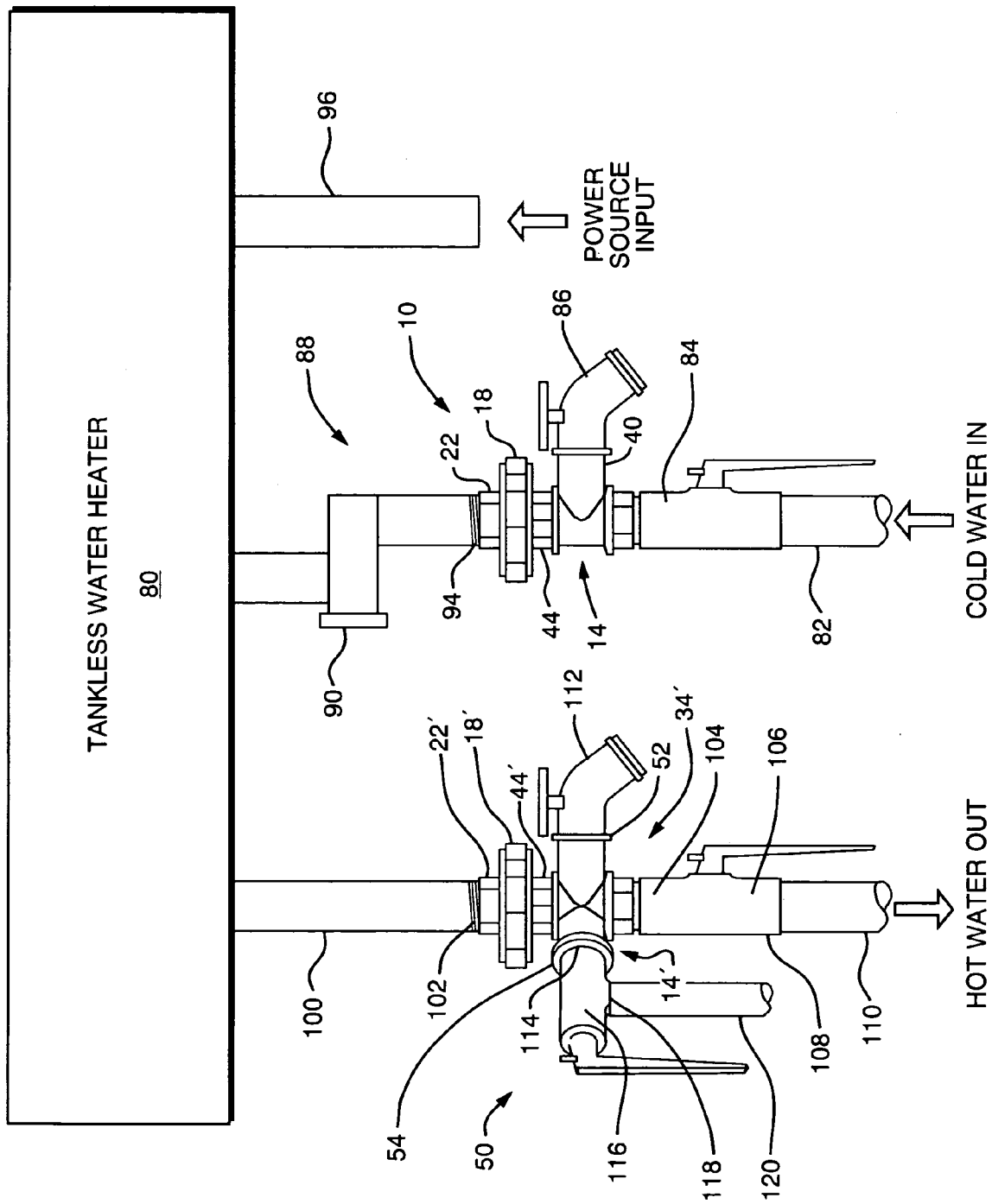
FIG. 6 is a schematic diagram showing a tankless water heater connection using the quick connect and quick disconnect plumbing apparatus.

Referring now to the schematic drawing of FIG. 6, there is shown a tankless water heater 80 that is connected to a cold water supply and a power supply, neither of which is shown. Cold water from the cold water supply is fed through a pipe 82 to a plumbing device 84, for example, a valve such as a ball valve. Ball valve 84 is connected to quick connect and quick disconnect plumbing apparatus 10. A plumbing device 86, for example, a faucet or hose bibb is connected to female branch 40. An inlet pipe assembly 88 having a water filter and drain assembly 90 connected thereto is attached to quick connect and quick disconnect plumbing apparatus 10 by head 22. In order to secure inlet pipe assembly 88 to quick connect and quick disconnect plumbing apparatus 10, union nut 18 is loosened, whereby head 22 is free to rotate. The lower end of inlet pipe assembly 88 is provided with an externally threaded end 94 that mates with the internal threads of head 22. Head 22 is turned until it is securely fastened to the threaded end 94 of inlet pipe assembly 88. Then, union nut 18 is turned onto threaded member 36 (shown in FIG. 5) using a tightening tool (not shown), for example a wrench. Preferably, tee portion 14 is held in place during the tightening procedure by positioning a gripping tool (not shown), for example, a wrench, about hold 44. The tankless water heater 80 is powered through an input 96. Burners (not shown) within tankless water heater 80 can be powered by either gas or electricity. Control circuits and motors (not shown) within tankless water heater 80 are powered by electricity. The burners heat a heat exchanger (not shown) within tankless water heater 80. The cold water passes through the heat exchanger where it is heated to a selected temperature. The hot water exits tankless water heater 80 through an outlet pipe 100.

In the illustrated embodiment of FIG. 6, outlet pipe 100 is connected to quick connect and quick disconnect plumbing apparatus 50. In order to connect outlet pipe 100 to quick connect and quick disconnect plumbing apparatus 50, union nut 18' is loosened, whereby head 22' is free to rotate. The lower end of outlet pipe 100 is provided with an externally threaded end 102 that mates with the internal threads of head 22'. Head 22' is turned until it is securely fastened to the threaded end 102 of outlet pipe 100. Then, union nut 18' is turned onto a threaded member 36' (shown in Fig. 2) using a tightening tool (not shown), for example a wrench. Preferably, tee portion 14' is held in place during the tightening procedure by positioning a gripping tool (not shown), for example, a wrench, about hold 44'. An inlet side 104 of a plumbing device 106. for example, a valve such as a ball valve, is connected to lower section 34'. An outlet side 108 of ball valve 106 is connected to an outlet pipe 110 for distribution of the hot water. A faucet or hose bibb 112 is attached to female branch 52 and an input side 114 of a plumbing device 116. for example, a pressure relief valve, is attached to female branch 54. An outlet side 118 of pressure relief valve 116 is connected to a discharge pipe 120. In an alternative embodiment, quick connect and quick disconnect plumbing apparatus 10 is positioned on the hot water outlet side of tankless water heater 80 and quick connect and quick disconnect plumbing apparatus 50, with pressure relief valve 116, is positioned on the cold water supply line.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A quick connect and quick disconnect plumbing apparatus configured to interconnect a first device and a second device, said quick connect and quick disconnect plumbing apparatus comprising:
    (a) a union portion having a union tail and a union nut, said union nut being internally threaded and having an internal flange, said union nut defining a first connecting means, said union portion having first and second ends, said union tail having an internally threaded grippable head, an external flange and an inwardly tapered external seat, said grippable head received in said first connecting means at said first end of said union portion, an inside diameter of said internal flange being smaller than an outside diameter of said external flange said internal threads of said grippable head of said union tail adapted for connecting said union portion to the first device; and
    (b) a tee portion having an upper section, an intermediate section and a lower section,
    (c) said upper section having an externally threaded member with an inwardly tapered internal seat, said tee portion having first and second ends, said second end of said union operatively connected to said first end of said tee portion, another externally threaded member defining a second connecting means at said second end of said tee portion, said second connecting means sized and shaped for connecting said tee portion to the second device, a passage formed in said union portion and tee portion from said first end of said union portion to said second end of said tee portion when said union portion and said tee portion are connected, said external seat of said union tail being seated in said internal seat of said upper section.

2. The quick connect and quick disconnect plumbing apparatus as claimed in claim 1 including a third connecting means at said second end of said union portion and a fourth connecting means at said first end of said tee portion, said third and fourth connecting means sized and shaped to interconnect with one another for connecting said union portion and said tee portion, said said external seat of said union tail and said internal seat of said upper section being in mating seating engagement when said union portion and said tee portion are connected.

3. The quick connect and quick disconnect plumbing apparatus as claimed in claim 1 wherein said intermediate section includes a member having a port that is sized and shaped to interconnect with a third device, said port communicating with said passage.

4. The quick connect and quick disconnect plumbing apparatus as claimed in claim 3 wherein said member is a female branch.

5. A quick connect and quick disconnect plumbing apparatus for connecting one of a cold water inlet and a hot water outlet of a tankless water heater to one of a cold water supply inlet conduit and a hot water outlet conduit, respectively, and for connecting at least one plumbing device to said quick connect and quick disconnect plumbing apparatus, said quick connect and quick disconnect plumbing apparatus comprising:
    (a) a union having first and second ends, said union including a first connecting means, a second connecting means and an external seat, said first connecting means at said first end of said union, said second connecting means at said second end of said union, said first connecting means provided for connecting said quick connect and quick disconnect plumbing apparatus to one of the cold water inlet and the hot water outlet of the tankless hot water heater; and
    (b) a tee having first and second ends, said tee including upper, intermediate and lower sections, said intermediate section disposed between said upper and lower sections, a third connecting means and an inwardly tapered internal seat at a said first end of said tee, said second connecting means and said third connecting means configured to interconnect with one another for connecting said union and said tee, said external seat in mating seating engagement with said internal seat when said second connecting means and said third connecting means are interconnected, a fourth connecting means at the second end of the tee, said fourth connecting means provided for connecting said quick connect and quick disconnect plumbing apparatus to the cold water supply inlet conduit when said first connecting means is connected to the cold water inlet of the tankless water heater and to the hot water outlet conduit when said first connecting means is connected to the hot water outlet of the tankless hot water heater, a passage formed in said union and said tee from said first end of said union to said second end of said tee when said union and said tee are interconnected;
    wherein said union includes a union tail member and an internally threaded union nut, said union tail member and said union nut sized and shaved so that said union tail member is received within said union nut, said union tail member having an internally threaded head that terminates in said external seat, said internally threaded head being said first connecting means and said internally threaded union nut being said second connecting means.

6. The quick connect and quick disconnect plumbing apparatus as claimed in claim 5 wherein said intermediate section includes at least one female branch extending from said passage, said female branch configured to interconnect with one plumbing device, said passage extending into said female branch.

7. The quick connect and quick disconnect plumbing apparatus as claimed in claim 5 wherein said intermediate section includes two female branches, one of said female branches configured to interconnect with one plumbing device and another one of said female branches configured to interconnect with a second plumbing device, said passage extending into each said female branch.

8. The quick connect and quick disconnect plumbing apparatus as claimed in claim 5 wherein said union tail member is formed with an external flange adjacent said first seating means and said union nut is formed with an internal flange, said internal flange of said union nut having an inside diameter that is smaller than an outside diameter of said external flange of said union tail member, whereby said union tail member is received in said union nut and is prevented from passing through said union nut by contact of said external flange with said internal flange.

9. The quick connect and quick disconnect plumbing apparatus as claimed in claim 8 wherein said fourth connecting means is a threaded connecting means.

10. The quick connect and quick disconnect plumbing apparatus as claimed in claim 8 wherein said fourth connecting means is a solder connecting means.

11. A quick connect and quick disconnect plumbing apparatus for connecting one of a cold water inlet and a hot water outlet of a tankless water heater to one of a cold water supply inlet conduit and a hot water outlet conduit, respectively, and for connecting at least one plumbing device to said quick connect and quick disconnect plumbing apparatus, said quick connect and quick disconnect plumbing apparatus comprising:

(a) a two-piece union having a union tail member and a union nut, said two-piece union having first and second ends said union nut being internally threaded and having an internal flange, said union tail having an internally threaded hexagonal head defining a first connecting means, an external flange and an inwardly tapered external seating means, said hexagonal head sized and shaped to be slidably received in said union nut, an inside diameter of said internal flange being smaller than an outside diameter of said external flange, said first connecting means at said first end of said two-piece union when said union tail is received in said union nut, said first connecting means sized and shaped for connecting said union to one of the cold water inlet and the hot water outlet of the tankless hot water heater, said internally threaded union nut defining a second connecting means at said second end of said two-piece union; and (b) a one-piece tee with upper, intermediate and lower sections, said tee having first and second ends, said first end of said tee being externally threaded and defining third connecting means, an internal seating means formed in said third connecting means, said second and third connecting means cooperating with one another for connecting said two-piece union and said one-piece tee, said internal seating means seating in said external seating means when said two-piece union and said one-piece tee are connected, a fourth connecting means at said second end of said tee said fourth connecting means sized and shaped for connecting said tee to the cold water supply inlet conduit when said first connecting means is connected to the cold water inlet of the tankless water heater and to the hot water outlet conduit when said first connecting means is connected to the hot water outlet of the tankless hot water heater, said intermediate section having at least one branch with an interconnectable port that is adapted for connection to one plumbing device, a passage formed in said two-piece union and said one-piece tee, said passage defining a channel for a fluid to flow from said first end of said two-piece union to said second end of said one-piece tee and through said branch.

12. The quick connect and quick disconnect plumbing apparatus as claimed in claim 11 wherein said fourth connecting means is a male threaded connecting means.

13. The quick connect and quick disconnect plumbing apparatus as claimed in claim 11 wherein said fourth connecting means is a solder connecting means.

14. The quick connect and quick disconnect plumbing apparatus as claimed in claim 11 wherein said branch is internally threaded.

15. The quick connect and quick disconnect plumbing apparatus as claimed in claim 11 wherein said intermediate section includes two branches, one of said branches adapted for connection to said one plumbing device and the other of said branches adapted for connection to a second plumbing device, said passage defining a channel for a fluid to flow from said first end of said two-piece union to said second end of said one-piece tee and through each said branch, one of said branches disposed in perpendicular relationship to the other of said branches.

16. The quick connect and quick disconnect plumbing apparatus as claimed in claim 11 including a holding means formed between said upper and intermediate sections for holding said quick connect and quick disconnect plumbing apparatus stationary during connection of said two-piece union to said one-piece tee.

17. The quick connect and quick disconnect plumbing apparatus as claimed in claim 11 including a holding means formed between said intermediate and lower sections for holding said quick connect and quick disconnect plumbing apparatus stationary during connection of said fourth connecting means to said plumbing device.

* * * * *